J. A. McCASKEY.
BASTING DEVICE FOR ROASTING PANS.
APPLICATION FILED OCT. 5, 1916.

1,277,968.

Patented Sept. 3, 1918.
2 SHEETS—SHEET 1.

Witness
Chduse Jr.

Inventor
J. A. McCaskey,
By Victor J. Evans
Attorney

J. A. McCASKEY.
BASTING DEVICE FOR ROASTING PANS.
APPLICATION FILED OCT. 5, 1916.
1,277,968.
Patented Sept. 3, 1918.
2 SHEETS—SHEET 2.
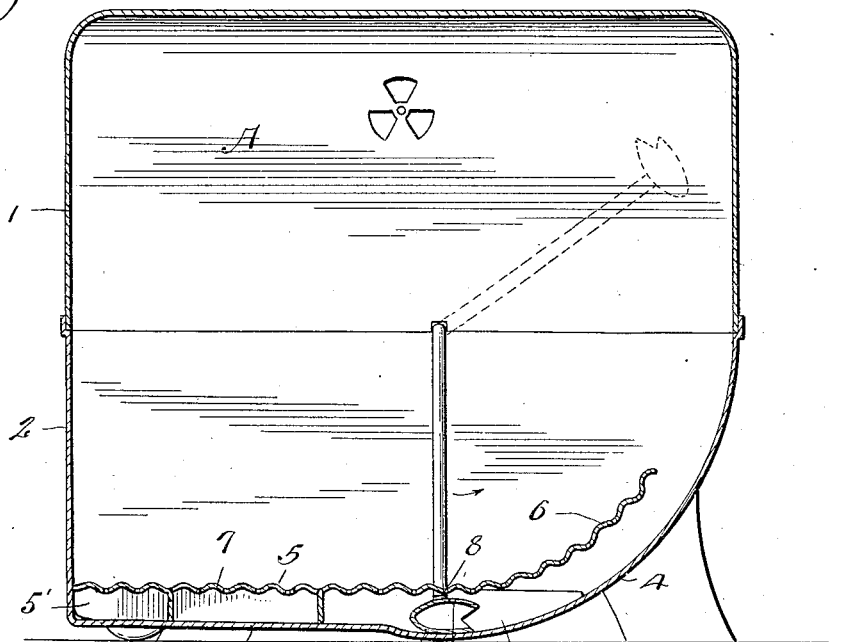
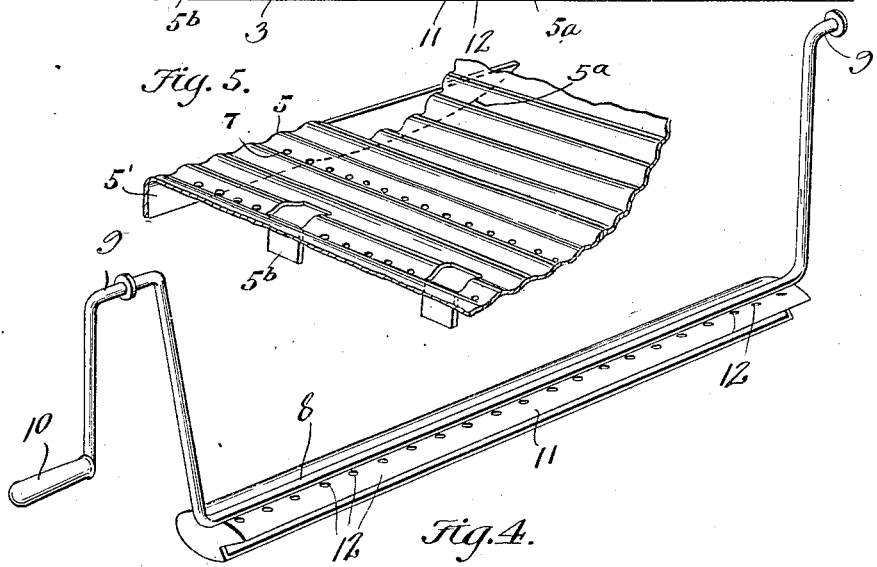

UNITED STATES PATENT OFFICE.

JOHN A. McCASKEY, OF HAGERHILL, KENTUCKY.

BASTING DEVICE FOR ROASTING-PANS.

1,277,968.  Specification of Letters Patent.  Patented Sept. 3, 1918.

Application filed October 5, 1916. Serial No. 123,910.

*To all whom it may concern:*

Be it known that I, JOHN A. McCASKEY, a citizen of the United States, residing at Hagerhill, in the county of Johnson and State of Kentucky, have invented new and useful Improvements in Basting Devices for Roasting-Pans, of which the following is a specification.

This invention relates to a device for basting meat within a roasting pan and has for its chief characteristic to provide a device of this character in which the basting means are operable exteriorly of the pan to eliminate the necessity of removing the lid of the pan and thus avoiding the liability of burning the hands.

Another characteristic of this invention is to provide a device of the above described character having means for concentrating the juices of the meat within the pan to effect a thorough basting of the meat.

Another characteristic of this invention is to provide a device of this character in which the basting means is rotatively mounted within the roasting pan whereby the juices of the meat may be precipitated upon the meat to cause the thorough basting of the same, the said means being provided with suitable openings to effect the gradual depositing of the juices upon the entire surface of the meat.

A further characteristic of the invention is to provide a device of the above described character which contains the desirable features of simplicity, durability and efficiency and furthermore a device which is manufactured at a nominal cost.

Other characteristics of the invention will appear as the specification is read in connection with the accompanying drawings, in which:—

Figure 1:
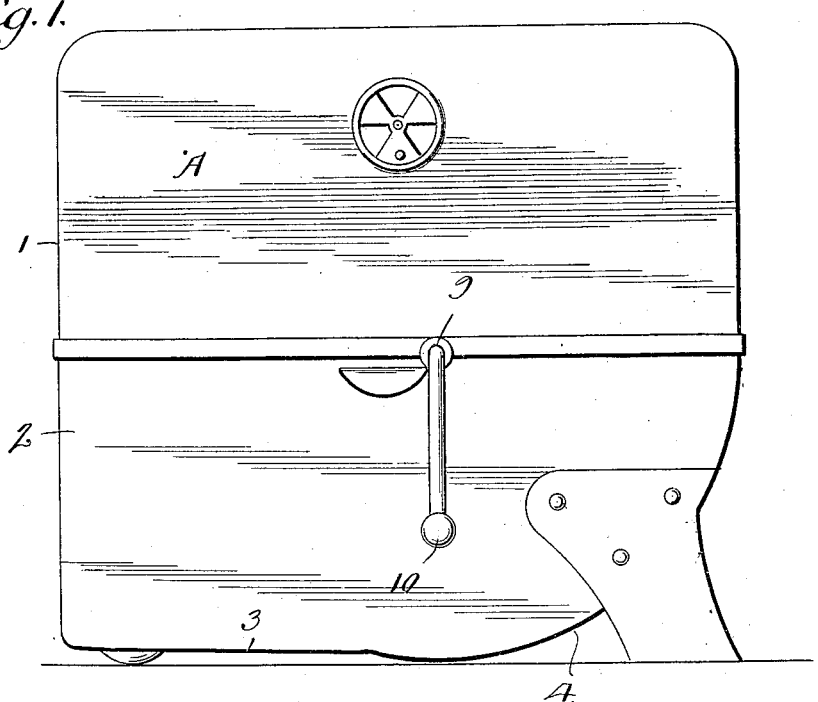
Figure 3:
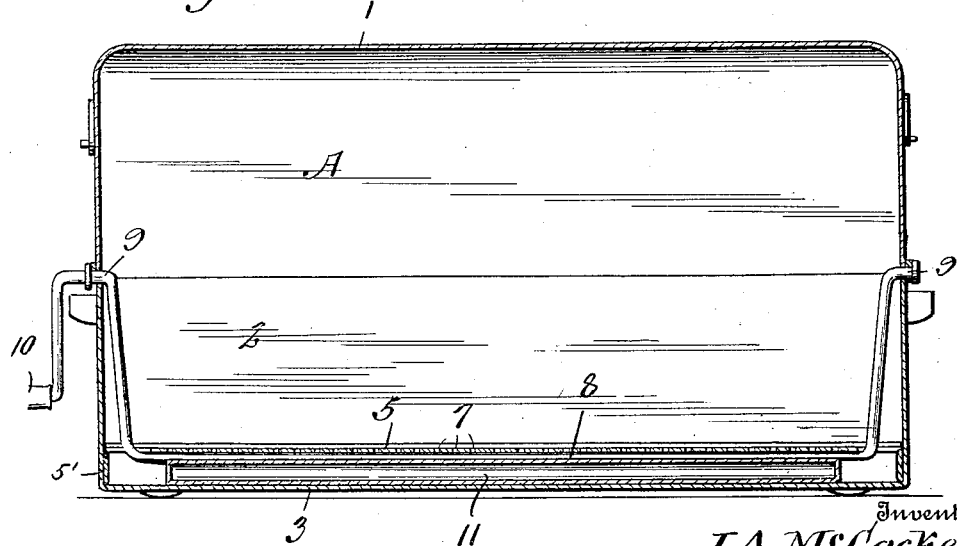

Figure 1 is a side elevation of the device constructed in accordance with my invention, Fig. 2 is a transverse section of Fig. 1, Fig. 3 is a longitudinal section of Fig. 1, Fig. 4 is a detail view of the basting element, Fig. 5 is a fragmentary perspective view of the false bottom.

Referring to the drawings in detail, my invention comprises a roasting pan generally indicated as at A and which is formed of any suitable material which is composed of the upper end 1 and the lower section 2 which are arranged in the usual manner to permit the removal of the upper section for removing or replacing the meat. The lower section 2 has its bottom wall transversely inclined from the front to the rear while the rear wall of the lower section and the intersection of the rear wall with the bottom wall is curved on the line of an arc as at 4. Arranged in superimposed relation to the bottom wall 3 is a false bottom 5 which is arranged in spaced relation to the bottom wall and has its rear portion curved upwardly as at 6 to conform to the curved portion 4. The false bottom 5 is preferably perforated as at 7 and is adapted to receive and support the meat thereupon, the perforations permitting the juices from the meat to percolate through the false bottom and onto the bottom 3. As previously described the bottom 3 is inclined transversely toward the curved portion whereby the residue or juices from the meat is caused to concentrate at the rear curved portion of the pan to facilitate the basting of the meat as will be hereinafter described.

My improved form of basting means comprises a substantially U-shaped shaft 8 which is arranged longitudinally of the lower section and has the opposite end thereof provided with stub shafts 9 which are journaled in the end walls of the lower section as clearly shown in the drawings. One of the stub shafts 9 is provided with a handle 10 whereby the shaft may be rotated within the pan as will be understood. Secured to the medial portion of the shaft 8 by rivets or any other suitable means is a scoop member 11, which is arranged longitudinally of the medial portion of the shaft 8 and is substantially C-shaped in cross section, the open end thereof receiving the juices as will be understood. The medial portion of the shaft 8 and consequently the scoop 11 are interposed between the false bottom 5 and the bottom wall 3, the vertical portion of the shaft 8 being mounted for sliding movement upon the opposite longitudinal edges of the false bottom as will be seen in Fig. 2 of the drawings. The false bottom 5 preferably comprises a corrugated plate or member, the perforations 7 being arranged in the grooves between two of the oppositely disposed ribs in the said plate, and the said perforations being also disposed at what may be termed the flat portion of the plate, or inwardly of the arcuate end 6 thereof. The plate 5 has its sides flanged, as at 5', the said flanges resting upon the bottom of the pan, and the plate, at its arched or curved end is reduced. The flange 5' extends beyond the reduced portion of the plate and its said extension is widened, as indicated by the numeral 5ª and has its lower edge rounded to engage within the depressed or downwardly curved portion 4 of the pan. The space between the rounded portion or end 6 of the plate 5 and the portion 5ª provided by the flanges 5' provide means whereby the arms of the substantially U-shaped shaft may be received therein, and by this arrangement it will be noted that the scoop member may be of a width almost equal to that of the width of the pan. In addition to the flanges 5' the plate 5 at determined intervals may be formed with substantially U-shaped slits and the metal bounded by the said slits bent downwardly forming fingers 5ᵇ which contact with the bottom of the pan and serve as reinforcing or supporting elements for the false bottom.

It will be evident from the foregoing construction taken in conjunction with the accompanying drawings, that in practice, the meat is placed upon the false bottom 5, the juices from the meat passing through the perforations 7 and off to the bottom wall 3. Owing to the inclination of the bottom wall, the juices will be precipitated toward the rear of the pan into the pocket provided between the said inclined portion of the bottom and the curved portion 4. To thoroughly baste the meat the shaft 8 is oscillated by means of the handle 10 thereby moving the scoop 11 between the false bottom 5 and the bottom 3 and upwardly over the curved portion 4 to the top of the pan.

It will be manifest from the foregoing operation that the juice is forced into the scoop 11 and carried by the scoop to the opposite sides of the meat, the perforations 12 admitting the juice to gradually be deposited upon the meat during the movement of the scoop. After the scoop has completed its upward stroke, the motion of the shaft may be reversed whereby the scoop will be returned to its normal position where it again may be refilled with the juice and the previous operation repeated.

It will be obvious from the foregoing that I have provided a simple and efficient means for collecting the juice and for basting the meat with the juice, the means for basting the meat being of simple and efficient construction to cause a thorough saturation of the meat with its juices. It will be further evident that the basting operation may be performed without necessitating the removal of the top section of the pan thus eliminating the liability of the operator burning or injuring his hands in any manner.

It is thought from the foregoing taken in connection with the accompanying drawings that the construction and operation of my device will be apparent to those skilled in the art, and that minor changes in size, shape, proportion and minor details of construction may be made without departing from the spirit and scope of the appended claim.

What I claim is:—

The combination with a roasting pan having its bottom wall inclined toward its rear wall and its rear wall rounded and extended upward to the bottom wall providing a pocket at the rear portion of the said bottom wall, a C-shaped scoop having a perforated top normally arranged in the pocket, a U-shaped shaft secured to the scoop and having angular ends journaled in bearing openings in the sides of the pan, an operating handle for said shaft, a false bottom comprising a corrugated plate in the pan, said bottom including a curved wall which is of a less width than the bottom proper and which is arranged over the curved end of the pan, flanges on the sides of the plate contacting with the bottom of the pan, said flanges having widened portions received in the pocket of the pan, said bottom, at spaced intervals having U-shaped slits, and the metal bounded by the slits bent downwardly to provide fingers which also rest on the bottom of the pan, said false bottom, in the grooves thereof, having perforations, and the arms of the U-shaped shaft being received in the spaces between the side flanges and the rounded end of the false bottom and by virtue of contact with the wall between the said flanges and the said rounded end of the false bottom to limit and prevent the swinging of the scoop in one direction.

In testimony whereof I affix my signature.

JOHN A. McCASKEY.

Copies of this patent may be obtained for five cents each, by addressing the "Commissioner of Patents, Washington, D. C."